G. E. HOLLAND.
APPARATUS FOR LOADING AND UNLOADING COAL AND OTHER CARGO.
APPLICATION FILED JAN. 30, 1911.
1,036,495.
Patented Aug. 20, 1912.
2 SHEETS—SHEET 1.
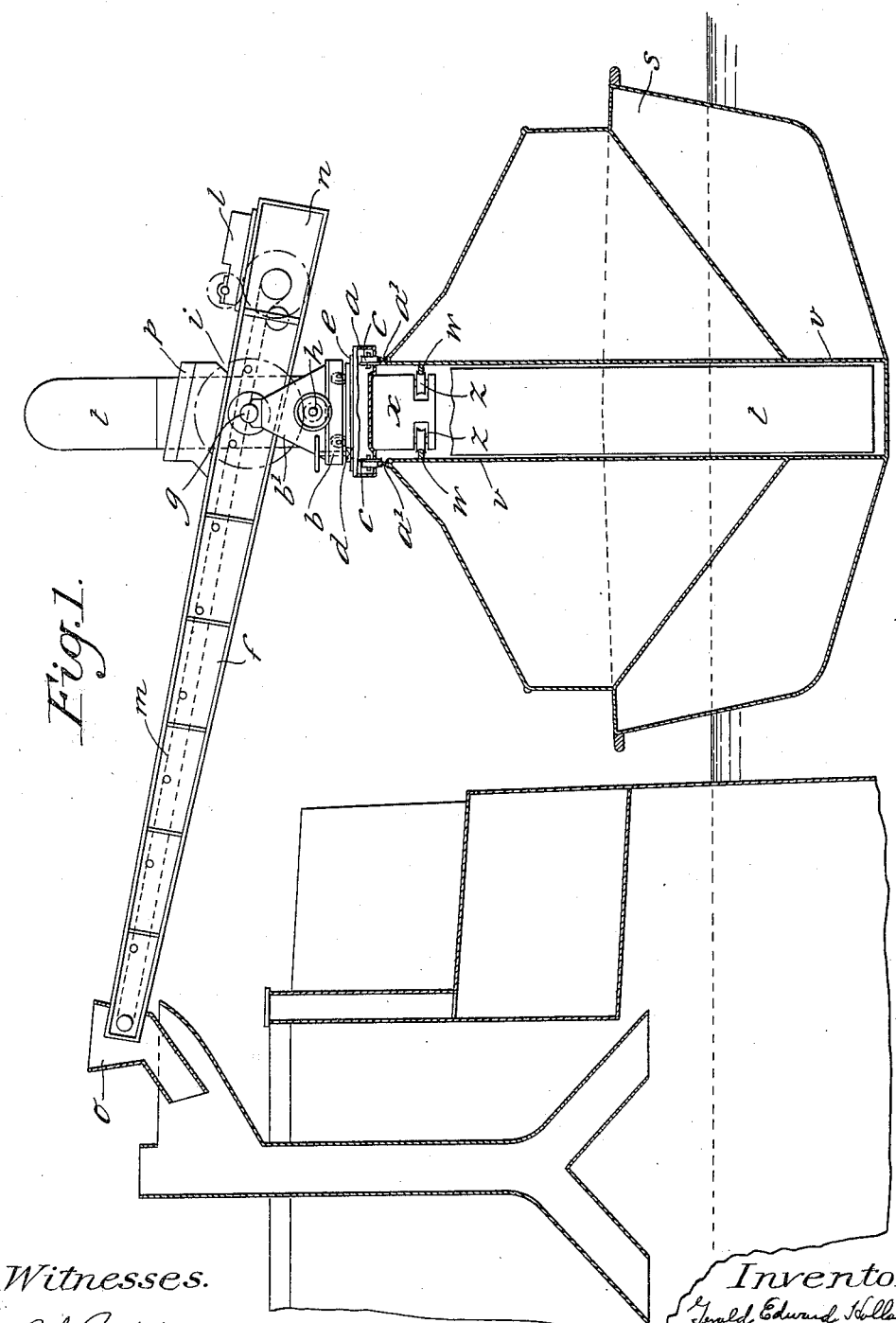
Witnesses.
R. A. Balderson
Jesse B. Hiller
Inventor.
Gerald Edward Holland
by Bakewell, Byrnes & Parmelee
his attorneys G. E. HOLLAND.
APPARATUS FOR LOADING AND UNLOADING COAL AND OTHER CARGO.
APPLICATION FILED JAN. 30, 1911.
1,036,495.
Patented Aug. 20, 1912.
2 SHEETS—SHEET 2.
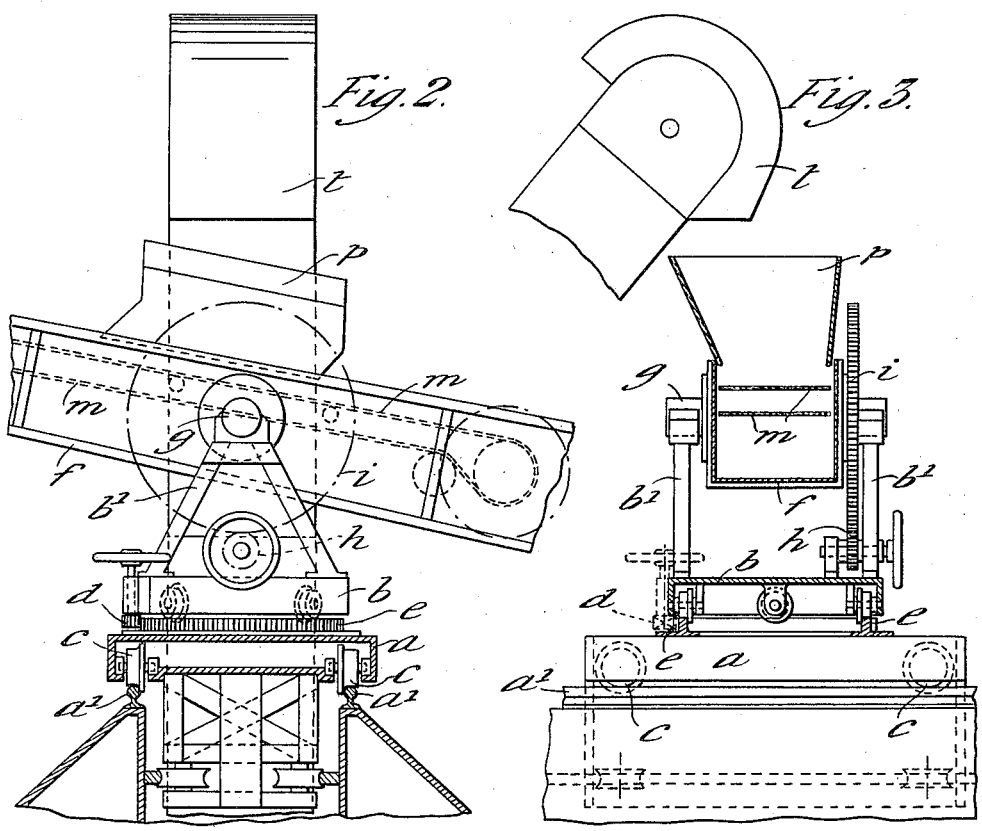

UNITED STATES PATENT OFFICE.

GERALD EDWARD HOLLAND, OF HOLYHEAD, ENGLAND.

APPARATUS FOR LOADING AND UNLOADING COAL AND OTHER CARGO.

1,036,495.  Specification of Letters Patent.  Patented Aug. 20, 1912.

Application filed January 30, 1911. Serial No. 605,484.

*To all whom it may concern:*

Be it known that I, GERALD EDWARD HOLLAND, a subject of the King of Great Britain, residing at Bryn-y-mor, Holyhead, in the county of Anglesey, Wales, England, have invented certain new and useful Improvements in Apparatus for Loading and Unloading Coal and other Cargo, of which the following is a specification.

This invention relates to apparatus for loading and unloading coal or other bulk cargo, and for raising the cargo from a ship's hold and delivering it to a point exterior of the ship, and which apparatus comprises in combination an elevating device mounted on wheels so that it may be moved in a direction longitudinally of the ship, and a movable and adjustable transporting device associated with the elevating device.

It consists in improvements according to which the carriages of the elevating and transporting devices are respectively mounted on superimposed rail tracks carried by the vessel or ship so that the elevator and transporter can be moved translationally in the same vertical plane, and independently one of the other. In other words the plane of support of the elevator is co-incident with the plane of support of the transporter.

The invention will be described as applied to a vessel or lighter having a central passage or alley-way adapted to accommodate the trunk of the elevator which may be mounted to run on longitudinal rails along the length of the ship so as to enable the elevator to be moved from point to point longitudinally for the purpose of raising the coal or the like at any point along the passage.

The invention is illustrated in the accompanying drawings in which—

Figure 1 is a diagrammatic sectional elevation of a vessel and of the loading or unloading apparatus, a portion of the elevating device being omitted; Figs. 2 and 3 are views at right angles to one another, on an enlarged scale, of parts of the apparatus.

The conveying device consists of a carriage $a$ capable of running by means of the wheels $c$ on rails $a'$ carried by the vessel. On this carriage $a$ is mounted a turn-table $b$, which can be caused to revolve by means of the gear wheel $d$, the pinion of which gears with a rack $e$ on the carriage $a$. In brackets $b'$ fixed on the turn-table $b$ the conveyer $f$ is mounted on trunnions $g$, so that its ends may be capable of being lowered or elevated by means of the pinion wheel $h$ which gears with the toothed wheel or segment $i$ keyed on a trunnion of the conveyer. The conveyer $f$ is provided at its rear end with engines $l$ for working the conveyer band $m$ and is also formed or provided with a balance weight $n$ at its rear end and at its front end with a chute $o$. It is also provided with a hopper $p$ immediately over the trunnions $g$.

The vessel or lighter $s$ is provided with a longitudinal passage $v$ extending nearly the whole length of the vessel and communicating with bunkers on each side of it. The cargo, discharged from the bunkers into this passage, is collected and lifted by the elevating apparatus $t$ which is caused to travel along the rails $w$ supported on each side of the passage below the rails $a'$. In unloading the cargo the carriage $a$ of the conveyer is positioned on the rails $a'$ in juxtaposition to the elevator $t$ so that the cargo being raised by the elevator $t$ is discharged into the hopper $p$ of the conveyer and is then carried along the conveyer to the chute $o$ and thence discharged on to a wharf or into trucks or a ship's hold as shown. The conveyer is preferably guided and steadied by an underframing $x$ provided with rollers $z$ which bear against rails $w$ on the sides of the trunk or passage $v$.

As the conveyer is mounted on the trunnions $g$ its discharge end can be adjusted to any desired height by means of the gear wheel $h$, and as it is also mounted on the turn-table $b$ which can be rotated by the gear wheel $d$, the discharge end of the conveyer can be turned to any part of a complete horizontal circle so as to deliver the cargo at any desired point.

Having now particularly described and ascertained the nature of my said invention and in what manner the same is to be performed, I declare that what I claim is:—

1. In a ship or vessel, the combination of superimposed sets of rail tracks, an elevator adapted to travel on one of the sets of rail tracks, a wheel carriage supported on another of said sets of rail tracks, said carriage being separated from the elevator and adapted to be traversed independently in the same vertical plane as the said elevator, and a pivotally mounted transporting device supported on said carriage.

2. In a vessel, the combination of superimposed sets of rail tracks, longitudinal of the ship, an elevator mounted on wheels adapted to travel on one of the sets of rail tracks, a separate wheeled carriage supported on another of said sets of rail tracks and adapted to travel independently thereon in the same vertical plane as the elevator, a turn-table carried by the carriage, a conveyer journaled on the turn-table, means for revolving the turn-table with the conveyer into any axial vertical plane, and means for turning the conveyer on its journals whereby an end of the conveyer may be adjusted to any desired height.

In testimony whereof I have signed my name to this specification in the presence of two subscribing witnesses.

GERALD EDWARD HOLLAND.

Witnesses:
JOSEPH WILLARD,
J. W. PATCHING.

Copies of this patent may be obtained for five cents each, by addressing the "Commissioner of Patents, Washington, D. C."